United States Patent [19]

Watanabe et al.

[11] 4,252,326
[45] Feb. 24, 1981

[54] SOUND REPRODUCING DEVICE

[75] Inventors: Katsumi Watanabe; Yutaka Shiseki, both of Kawasaki; Eishi Koike, Sagamihara, all of Japan

[73] Assignee: Ozen Co., Ltd., Machida, Japan

[21] Appl. No.: 923,302

[22] Filed: Jul. 10, 1978

[30] Foreign Application Priority Data

Mar. 18, 1978 [JP] Japan ................................ 53-31265

[51] Int. Cl.³ ............................................. G11B 25/04
[52] U.S. Cl. .................................................... 369/79
[58] Field of Search ............... 274/9 R, 9 B, 9 C, 1 A; 339/17 R, 17 C; 29/628

[56] References Cited

U.S. PATENT DOCUMENTS

| | | | |
|---|---|---|---|
| 3,104,926 | 9/1963 | Scoville | 339/17 C |
| 3,633,923 | 1/1972 | Watanabe | 274/1 A |
| 3,740,056 | 6/1973 | Nuttall et al. | 274/1 A |
| 3,773,331 | 11/1973 | Watanabe | 274/9 R |
| 3,823,946 | 7/1974 | Nakajima | 274/9 R |
| 4,004,815 | 1/1977 | Watanabe | 274/1 A |
| 4,078,808 | 3/1978 | Hughes | 274/9 R |

Primary Examiner—Steven L. Stephan
Attorney, Agent, or Firm—Basile, Weintraub & Hanlon

[57] ABSTRACT

A sound reproducing device is driven by an electric motor powered by a cell or battery. The lead wires extending between the battery and the electric motor are securedly connected at their points of junction by either the resilient forces exerted by the lead wires themselves which exhibit spring properties and/or by a biasing force applied by the casing assembly of the reproducing device, itself. Furthermore, the spring-like lead wires are, also, utilized to define a spring acting stop switch operable for both starting and stopping of the sound reproduction, and particularly, to form an electrical switch(es) interconnected with a cover lid. Owing to the simplified construction as mentioned above, the electrical circuit of the device of this kind can be readily arranged in the device accompanied by superior electrical characteristics.

8 Claims, 2 Drawing Figures

SOUND REPRODUCING DEVICE

BACKGROUND OF THE INVENTION

I. Field of the Invention

This invention relates to a sound reproducing device, and more particularly, to a sound reproducing device wherein a record disc is driven by an electric motor using at least one battery as its power source, and which deploys an improved electrical connection laid in the casing assembly of the device.

II. Prior Art

Toys, such as, dolls, puppets, laughter bags or the like incorporating a sound reproducing device, generally, are designed to be inexpensive from a manufacturing point while still being sturdy and durable.

The sound reproducing mechanism of such toys is delicate and is susceptible to damage. Indeed, most of the trouble is encountered in forming or laying an electrical circuit in the device which is driven by an electric motor using a battery or batteries. This is because most of the components of this kind of assembly are fabricated continuously, on a mass production scale, from injection molded plastics, which require much soldering work in laying an electrical circuit or circuits in the assembly, i. e., in wiring lead wires in the assembly. However, the entire fabricated plastic assembly and the soldering work applied to the body thereof are inherently incompatible. In fact some portions of the lead wire-supporting chassis are often partly fused by the heat of the soldering work, thus, resulting in partial distortion of the chassis. This, of course, is accompanied by poor electrical connection of the lead wires in the circuit, or may result in a separation of the soldered junctions. These frailties have exceedingly lowered the reliability of the products under consideration herein.

Also, smoke and offensive odors developed from the burning of the plastic material have been blamed as one of the causes adversely affecting a worker's health.

Furthermore, soldering work applied to such plastic bodies requires a high grade of skill and a long period of work time, and, therefore, has proven to be a serious bottleneck in the production of this kind sound reproducing device.

Many of the defects or rejects of the soldered parts, with respect to the electrical requirements, are found in switch assemblies because they are usually comprised of very small parts and are required to be mounted to their mating parts or bases or to the relating lead wires by means of soldering.

According to the knowledge and experience obtained heretofore by the inventor, there is no sound reproducing device of this kind in which lead wires, in an electric circuit starting from the battery to a driving motor, are connected by means of a resilient force exerted by the lead wires themselves and a biasing force applied by a casing assembly. Further, in the present device a switch means is defined by the lead wires which are of small diameter or in strip form. The present invention thus obviates all the troubles encountered in the wiring work of the devices of the kind under consideration herein.

OBJECTS OF THE INVENTION

In view of the drawbacks of the prior art, it is an object of this invention to improve upon the electrical connection of a sound reproducing device and to thereby raise the reliability in lead wire junctions in its electrical circuit.

Another object of the invention is to simplify the construction of the electrical circuit by making the switch means in the circuit comprised of lead wires integral with adjoining parts of the lead wires.

A further object of the invention is to eliminate defects in electrical properties at the junctions of the wiring of the electrical circuit.

A further object of the invention is to provide an improved switch means which satisfies the required electrical performance.

A still further object of the invention is to provide an electrical circuit of the sound reproducing device free from any soldered junctions.

SUMMARY OF THE INVENTION

It is a feature of this invention to perform the wiring of the electrical circuit of the sound reproducing device by effectuating electrical contact via a spring property imparted to the lead wire or wires which comprise the electrical circuit and/or via a "biasing force" exerted by a casing assembly of the sound reproducing device. By the term "biasing force" is meant a force developed when a chassis and housing associated with the device are assembled together. In practice the device may include forces developed whre each mating end of the lead wires are snapped when overlapped between the chassis and housing. According to a preferred manner of this invention the portions of the lead wires to be connected to each other are guided to a part of the chassis such that each free end of each wire is gathered and laid aside and then they are retained by a projection provided on the chassis inward of the housing. In this manner of connection, lead wires in the circuit can be firmly and fixedly connected without requiring any screw tightening or similar fastening assemblage.

Where electrical connection is achieved using the spring property of the lead wires, the wires are guided to ride over or aside upstanding posts provided on the chassis such that a certain length of the free end of the wire or wires psss over the posts in an opposite direction, whereby an electrical connection can be resiliently secured. Alternatively, the lead wires to be connected together are placed into contact and are biased toward each other from opposite directions. In the latter type of connection, one of the mating wires is preferably formed from a metal strip.

The lead wire material may be of any metal having spring properties and in any form, such as, a round wire or a flat strip.

According to the present invention, a stop switch or shut-off switch means can be formed by the lead wires themselves.

In such instance, the lead wires are fabricated from either a metal wire of very small diameter or from a strip of very small thickness, and are positioned to extend up to the end or shut-off position of the record. At this position the pickup will be resiliently biased by the wire against the normal movement of the pickup from the starting position towards the end position. When this switching device is applied to a sound reproducing device of the changeable type, a switch lever is provided at the back side of a bottom cover lid in such a manner that it engages with the extended part of the switch wire and urges it toward the line-up circuit of the motor while the cover lid is being closed. Conversely, the switch lever is released from engagement with the wire when the bottom cover lid is open.

For a more complete understanding of the present invention reference is made to the following detailed description and accompanying drawing. In the drawing like reference characters refer to like parts throughout the several views in which:

DESCRIPTION OF THE PREFERRED EMBODIMENT

Figure 1:
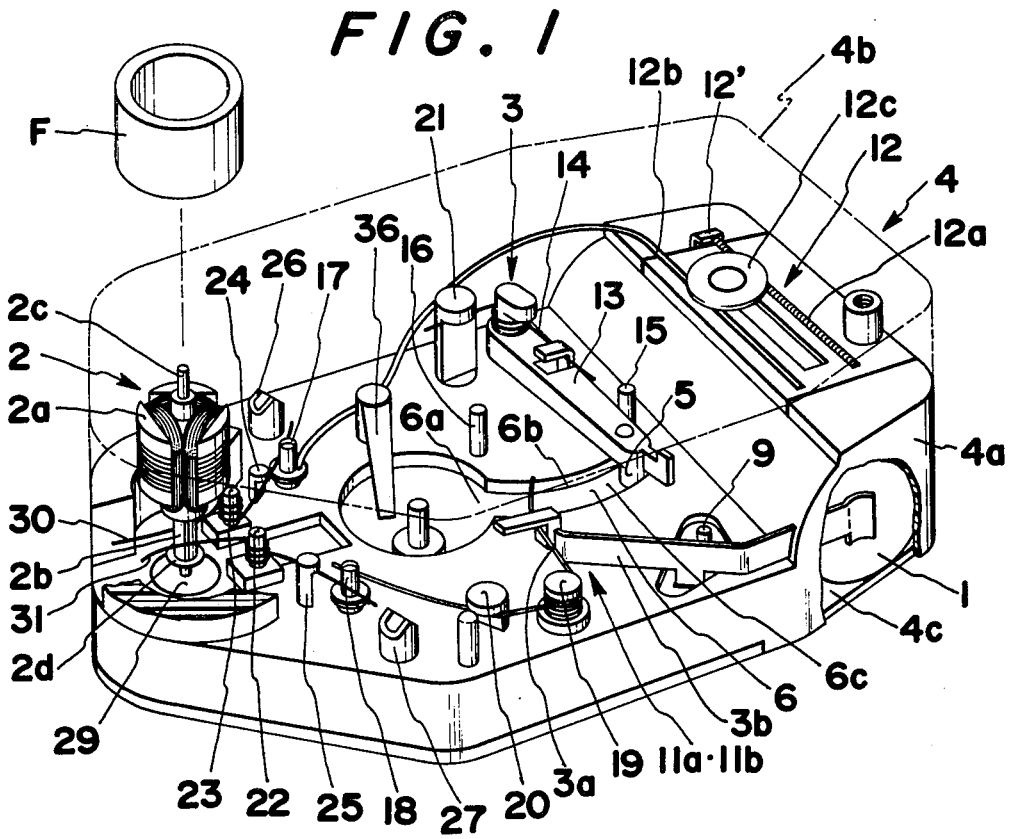
FIG. 1 is a partially cutaway, perspective view of a phonograph in accordance with the present invention and having the speaker and record disc removed for purposes of clarity.

As illustrated, FIG. 1 shows an assembly of the chassis of a phonograph of the present invention as including a mating housing in a dotted line, also, an electric motor 2 is shown in exploded view to better illustrate the construction thereof. Other parts or components which are not directly relevant to the present invention are also omitted.

In the drawing, casing assembly 4 comprises an integrally formed casing defined by a housing 4b mounted upon the chassis assembly 4a in a superposed relation. A battery case or compartment 4c is formed in chassis 4a and in which a battery 1 is received. Proximate the upper surface of the battery case 4c a variable resistor 12 is provided. The resistor 12 compensates for the power drop of a driving motor due to a voltage drop in the battery during usage by lowering the resistance in the electrical circuit of the device. Thus, the resistor maintains the number of rotations of a turn table at a constant rate.

An electrical terminal 12' resiliently engages with and biases a part of a resistance wire 12a which leads to the battery 1. Also, in the resistor 12 a lead wire 12b is placed in parallel relationship to the resistance wire 12a one end of which extends over the chassis 4a. A slidable control clip 12c slidably bridges both the resistance wire 12a and the lead wire 12b and, thus, regulates the electric current to the lead wire 12b.

A pickup arm 13 is pivotally supported at one end on the upper surfce of th chassis 4a to permit the pickup arm 13 to swingably move in a first direction parallel to the upper plane of the chassis 4a and in a second direction to approach or move away from the same plane. The pickup arm 13 carries at its other end a pick up 5. The pick up 5 is, also, swingably movable in the first and the second directions.

The pickup arm 13 is biased by a wire spring 14 toward the starting or initiating position of sound reproduction. The spring 14 lies in the first direction and also, is biased in the second direction, i. e., away from the surface of the upper plane of the chassis, to wit, away from a record disc (not shown).

A pickup arm stopper 15 is disposed at the startig position and a similar stopper 16 is disposed at the shut-off or end position.

A pair of intermediate metallic electric terminals or posts 17 and 18 are mounted onto and extend upwardly from the surface of the chassis 4a.

An arcuate aperture 6b which is formed through the surface plate of the chassis 4a is a path for the swing motion of the pickup 5 of the pickup arm 13. The present device further comprises a switch mounting post 19 and a switch biasing post 20 as well as a vertical biasing post 21 both for the wire spring 14 and the lead wire 12b. Two pairs of vertical posts 22, 23 and 24, 25 provide, respectively, brush mounting posts and brush biasing posts.

A pair of vrtical posts 26 and 27 are provided on the chassis. The posts function as fulcrums for receiving two lateral arms, of a sound transmitting rod, as will be explained hereafter.

In accordance herewith, the electric motor hereof is constructed so as to be able to perform the aimed objects of this invention in the most effective manner. To these ends, the motor has no discrete frame construction, but has a rotor unit consisting of an armature winding assembly 2a and a commutator 2b which are secured about a shaft 2c in coaxial alignment.

The rotor unit of the motor 2 is rotatably supported on the casing assembly 4, by two bearings 28 and 29 provided in the chassis 4a and housing 4b, respectively.

The free end of the shaft 2c extends downwardly through the bearing 29 into the space under the chassis 4a.

The motor further comprises a cylindrical permanent magnet F which fits about the winding 2a in the known manner.

The lower end of the commutator 2b has a flange 2d. The outer surface of the flange has a semispherical or conical configuration which enables the commutator 2b to electrically contact two resilient brushes, 30 and 31, by merely pushing down the rotor unit passing through the space between the brushes as the space is widened.

The brushes 30 and 31 are fabricated of small diameter metal wires which are wound around the mounting posts 22 and 23 at each intermediate portion thereof. One free end of each wire is positioned to resiliently cross the commutator 2b and each of the other free ends is retained by the intermediate terminal 17 or 18 via a resilient contact with the biasing post 25 or 26. Thus, the former free ends of the wires forming the burshes are biased against the surface of the commutator 2b.

Each side of the intermediate pole or post 17 or 18 opposite to the side whereon one free end of the brush 30 or 31 is biased is also contacted and biased by the free ends of the extended portion of the lead wire 12b or by one end of the switch wire 11a or 11b.

The extended portion of the lead wire 12b is also biased by the biasing post 21, while the end of the switch wire 11a or 11b is, also, biased by the switch biasing post 20.

The switch wire 11a is made of a small diameter metal wire and is wound around the switch mounting post 19. The free end of the wire is extended so as to cross the aperture 6b at the end position of the record playing cycle.

As noted, the switch wire 11a or 11b is bent after having been wound around the mounting post 19 such that it has an extension 3a which biases the pickup 5 against its travel as it approaches and goes towards the end position or sound reproduction shut-off position 6a.

An extended terminal plate extends into the battery case 4c and is retained by the chassis 4a. The plate comprises, at its free end a mating contact portion 3b for the opposing extension 3a. The portion 3b is located aside the extension 3a at an appropriate distance such that no substantial electrical connection is established therebetween as long as the pickup 5 remains at its end or shut-off position.

It is to be noted that, the extension 3a and the extended terminal plate having the mating portion 3b define an electrical switch which is open or off at the end position of sound reproduction.

Figure 2:
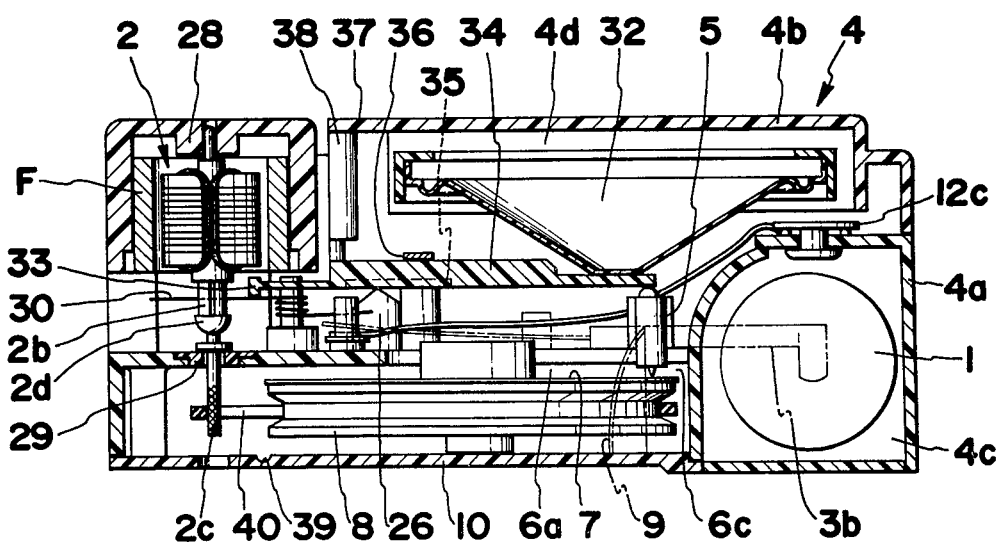
FIG. 2 is a vertical cross section of the assembly hereof.

As can be seen from FIG. 1 and FIG. 2, the extended terminal plate is held at its intermediate portion by a switch lever 9. The lever 9 is an upright projection provided on a cover lid 10. The lever 9 is, thus, held only when the cover lid 10 is in its closed position.

In the embodiment mentioned above, both the extension 3a and the mating portion 3b play two roles in combination; first, as a stop switch for the shut-off operation and, secondly, as a switch correlating with the opening or closing of the cover lid, i. e., as a cover lid link switch. Consequently, this switch construction enables the device to reduce the number of movable electrical contacts to as small as possible thereby to improve the electrical characteristics of the device.

Though not illustrated in the drawings, location of the cover lid link switch may be selected at any convenient place in the chassis. For example, the link switch may be located on the opposite side of the chassis to mate with the wire 3 by being laid aside at an appropriate distance therefrom. The switch is actuated only when the cover lid 10 is open by the aid of the other switch lever provided on the cover lid and is made independent of the stop switch for terminating sound playing.

The electrical cicuit of the present invention comprises a resistance wire 12a, a terminal 12' a control switch 12c, lead wire 12b, an intermediate terminal 17, a pair of wire brushes 30, 31, a winding of the armature 2a, a second intermediate terminal 18, a switch wire 11a (or 11b) and a mating switch contact 3b of the extended terminal.

In the foregoing embodiments described almost all of the electrical connections or junctions are made by utilizing the spring property of the wires themselves. However, it is, also, practicable though not depicted to make such junctions by placing mating wires which cross or overlap the primary wires and which are urged into contact by applying compressive force exerted by projections provided on the chassis 4a and the housing 4b. It should be noted that most of the circuit wires can be replaced with metal plates or strips herein.

Referring now particularly to FIG. 2 construction of the sound reproducing device of the present invention can be more clearly understood.

A transmitter rod 34 has two lateral arms 35 each of which swingably resets on fulcrums 26 and 27 (FIG. 1) respectively, in such manner that the two lateral arms bridge the two fulcrums. Hence, the entire transmitter rod is suspended by the two fulcrums for seesaw like swinging.

A spring 36 biases the transmitter rod 34 towards a record disc (not shown).

The transmitter rod rides, at its one end, on the pickup 5 while a brush actuating rod 33 provided at the opposite end of the rod 34 abuts against the pair of brushes 30 and 31.

A plurality of slits for transmitting the reproduced sound are cut-away in the top plate of the casing assembly 4. A flap 37 is formed in the housing 4b. The flap 37 has three of its four sides separated, by a surrounding slit, from the outer part of the top plate, but maintained integral therewith only at its nonslit side. Therefore, the flap 37 is capable of being flexibly swung up and down at its free end. A transmitter rod actuating rod 38 depends from the lower side of the free end of the flap from which abuts, at its downward travel, with the top surface of the sound transmitter rod 34.

Depression of the flap 37 moves the sound transmitter rod 38 downward which, in turn, pushes down the brush actuating rod 33 and at the same time raises up the part of the sound transmitter rod resting on the pickup 5. In other words, the depression of the flap urges the commutator 2b into contact with brushes 30 and 31 and at the same time releases a resilient restraining force applied to the pickup 5 by means of the lever action exerted by the fulcrums 26 and 27.

By the mode mentioned above, the pickup 5, by the biasing force of the spring 14, is out of engagement with the record and automatically returns from the end position 6a to its initial or starting position 6c of sound reproduction. When the pickup 5 lies at the end position 6a, the pickup holds and prevents the extended part 3a of the switch 11b from being in contact with mating part 3b of the other lead wire. Thus, electrical connection is broken.

Upon return of the pickup 5 to its initial or starting position 6c, the extended part 3a contacts mating part 3b. Thus, the electrical connection is re-established or is "on". At the same time, brushes 30, 31 move axially along the surface of the commutator 2b to assure smooth running of the driving motor, free from any poor starting or stoppage.

A cover lid 10 forming a baseplate for the chassis 4a is hinged at 39. A turn table 8 is mounted inside the chassis 4a upon which a record 7 is carried for rotation therewith.

On the inside surface of the cover lid 10, there also is provided the upstanding switch lever 9. A side ridge of the lever 9 is slanted and tapered such that it is wider towards its base and toward the inside surface, such that the slantly made side ridge engages with a part of the extended terminal 3b which mates with the extended part 3a of the switch wire 11a or 11b and further biases it along the base surface towards the part 3a as the cover lid is closed.

The output shaft of the motor 2c extends downward up to the entire peripheral side surface of the turn table 7 but is kept apart therefrom at a suitable distance. A resilient belt 40 extends peripherally about the output shaft 2c and the turn table 8. Thus, the motor 2 will rotate the turn tble 8 and in turn the record 7, and the reproducing stylus of the pickup 5 engages with a groove of the record as the pickup 5 travels from the starting position 6c toward the end or terminating position 6a.

The vibrations caused in the pickup 5 are transmitted through the transmitter rod 34 to a speaker cone 32 to reproduce an audible sound.

In the sound reproducing device of the present invention, electrical connections or junctions of the lead wires which comprise the electrical circuit are secured by means of the resilient force exerted by the spring property of the lead wires and/or by a biasing force provided by assembly of the casing assembly. Hence the present system is free of any soldering of the wire. Accordingly, the sound reproducing device of this invention can be exempted from any defects encountered in the production and from least possible fear of poor junctions.

According to this invention, electrical wire connections can be greatly simplified with respect to both the construction and production step of the sound reproducing device of this kind. Moreover, much higher reliability in electrical connection can be expected together with great strength and higher durability of the device.

Particularly, the switch mechanism of the device can be highly rationalized accompanied by superior electrical characteristics.

The various dimensional, orientational and geometric relationships set forth hereinabove, have been set forth, not with the intent of having the invention limited thereby, but, rather, to aid in an understanding of the present invention. It is to be expressly understood that such relationships and configurations may be modified without departing from the scope of the present invention and any such modifications thereof as may be suggested to those having the benefit of the teachings herein are intended to be reserved, specifically as they fall within the scope and spirit of the appended claims.

Having, thus, described the invention what is claimed is:

1. In a sound reproducing device of the type comprising a casing assembly housing a turn table for mounting a record disc thereon and imparting rotation to the record disc for reproducing a sound, an electric motor for driving the turn table, an electrical energy source as a power source for driving the electric motor and electrical circuit means for connecting the electrical motor and power source including lead wires, secured in the casing, the improvement which comprises:

said casing having a plurality of stationary conductors;
each lead wire comprising a segmented wire of at least two independent segments; and wherein each lead wire includes at least one segment that exhibits resilient properties which urges the at least one segment into contact with one or more of the stationary conductors.

2. The improvement of claim 1 wherein some of the lead wires are fabricated of metal spring strip, the strip defining the resilient property.

3. The improvement of claim 2 wherein some of the lead wires are bent to define the resilient property.

4. The improvement of claim 1 wherein the lead wires are bent to define the resilient property.

5. The improvement of claim 1 wherein the casing assembly biases the lead wires into contact with one or more of the stationary conductors.

6. The improvement of claim 1 which further comprises:
(a) a cover lid pivotally hinged at the bottom of the casing assembly,
(b) a switch lever extending upright on the cover lid, and wherein mating portions of the lead wires to be electrically connected to each other to close the circuit are normally placed apart in opposed relation and when said cover lid is closed said switch lever urges one of the lead wires toward the other mating wire so as to establish an electrical connection therebetween.

7. The improvement of claim 1 which further comprises:
(a) a cover lid pivotally hinged at the bottom of the casing assembly;
(b) a switch lever extending upright and disposed on the cover lid;
(c) a pickup which travels in a predetermined path over a record disc to an end position, for sound reproduction and wherein mating portions of the lead wires to be connected to each other to close the electrical circuit are fabricated of spring wire of small diameter, a free end of one wire being bent and extending toward the end position for sound reproduction of the device, an intermediate portion of the one lead wire being sustained by a portion of the other mating lead wire such that the extending free end of the one lead wire locates at or slightly before the end position, the sustaining portion of the other mating lead wire urging the extending free end of the one lead wire toward the end position, the sustained portion of the one lead wire and the sustaining portion of the other mating lead wire defining a shut-off switch, the free end of the one lead wire being released from its sustained relation by the pickup when the pickup travels to the end position, the shut-off switch cooperating with the switch lever on the cover lid to urge the other mating lead wire toward the extending free end of the one lead wire only when the cover lid is in the closed state to insure the sustained position and to relese the sustained position when the cover lid is opened.

8. The improvement of claim 1 wherein:
(a) at least a part of the lead wires are formed from a metal spring wire, a free end of a first wire in the circuit being bent and placed to extend toward the end of sound reproduction of the device, an intermediate portion of the first lead wire being sustained by a segment of a mating second lead wire such that the extended free end is urged toward and is located at or slightly before the end position, and
(b) the device further comprising a pickup which travels in a predetermined path along a record disc to the end position, the extended free end of the first wire being released from its sustained position by the pickup as it travels to its end position.

* * * * *